(12) United States Patent
Kusch et al.

(10) Patent No.: US 7,990,818 B2
(45) Date of Patent: Aug. 2, 2011

(54) CASCADED CONTROL OF A PICK-UP HEAD FOR MULTI-LAYER OPTICAL DATA STORAGE

(75) Inventors: Ruediger Kusch, Clifton Park, NY (US); Xiaolei Shi, Niskayuna, NY (US); Zhiyuan Ren, Malta, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 12/343,204

(22) Filed: Dec. 23, 2008

(65) Prior Publication Data

US 2010/0162280 A1 Jun. 24, 2010

(51) Int. Cl.
*G11B 7/00* (2006.01)

(52) U.S. Cl. ...................................... 369/44.29

(58) Field of Classification Search .................. None
See application file for complete search history.

(56) References Cited

U.S. PATENT DOCUMENTS

| | | | |
|---|---|---|---|
| 4,184,688 A * | 1/1980 | Omura et al. | 369/216 |
| 4,731,773 A * | 3/1988 | Lewkowicz | 369/59.11 |
| 4,805,163 A * | 2/1989 | Ohnuki | 369/44.32 |
| 5,025,330 A * | 6/1991 | Nishimiya | 360/78.04 |
| 5,136,441 A * | 8/1992 | Kobayashi | 360/78.12 |
| 5,321,685 A * | 6/1994 | Nose et al. | 369/126 |
| 5,398,221 A * | 3/1995 | Ogawa | 369/30.15 |
| 5,450,218 A | 9/1995 | Heanue et al. | |
| 5,510,912 A | 4/1996 | Blaum et al. | |
| 5,612,938 A * | 3/1997 | Dohmeier et al. | 369/47.32 |
| 5,677,809 A * | 10/1997 | Kadlec | 360/78.09 |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,850,470 B2 * | 2/2005 | Yamazaki et al. | 369/47.53 |
| 6,889,907 B2 | 5/2005 | Roh | |
| 7,020,054 B2 | 3/2006 | Kadlec et al. | |
| 7,388,695 B2 | 6/2008 | Lawrence et al. | |
| 2002/0057722 A1 * | 5/2002 | Kamon et al. | 372/43 |
| 2004/0156293 A1 * | 8/2004 | Pozidis et al. | 369/59.22 |
| 2004/0181798 A1 * | 9/2004 | Song et al. | 720/684 |
| 2005/0136333 A1 | 6/2005 | Lawrence et al. | |
| 2005/0162999 A1 * | 7/2005 | Yamashita | 369/44.34 |
| 2006/0073392 A1 | 4/2006 | Erben et al. | |
| 2006/0078802 A1 | 4/2006 | Chan et al. | |
| 2007/0097469 A1 | 5/2007 | Erben et al. | |

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Peter Vincent Agustin
(74) *Attorney, Agent, or Firm* — Fletcher Yoder (57) ABSTRACT

A system and method of controlling position of a pick-up head of an optical drive, including manipulating the position of the pick-up head as a primary variable in a cascade control scheme, and manipulating current flowing through the pick-up head as a secondary variable in the cascade control scheme.

21 Claims, 5 Drawing Sheets

U.S. PATENT DOCUMENTS

| | | |
|---|---|---|
| 2007/0146835 A1 | 6/2007 | Erben et al. |
| 2008/0055686 A1 | 3/2008 | Erben et al. |
| 2008/0068942 A1 | 3/2008 | Saito et al. |
| 2008/0144145 A1 | 6/2008 | Boden et al. |
| 2008/0144146 A1 | 6/2008 | Boden et al. |
| 2008/0159092 A1* | 7/2008 | Kagami et al. ............. 369/44.26 |
| 2010/0162280 A1* | 6/2010 | Kusch et al. .................. 720/659 |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/342,794, filed Dec. 23, 2008, John Anderson Fergus Ross et al.

U.S. Appl. No. 12/346,279, filed Dec. 30, 2008, Victor Ostroverkhov et al.

U.S. Appl. No. 12/346,378, filed Dec. 30, 2008, Xiaolei Shi et al.

U.S. Appl. No. 12/347,178, filed Dec. 31, 2008, Victor Ostroverkhov et al.

U.S. Appl. No. 12/347,211, filed Dec. 31, 2008, Xiaolei Shi et al.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/337,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

XP002574053; Jun. 7, 2007; Retrieved from the Internet: URL:http://www.controlguru.com/2007/070607.html; retrieved on Mar. 18, 2010; **the whole document*.

XP002574054; Apr. 3, 2002; Coleman Brosilow, Babu Joseph; "Techniques of Model-Based Control"; Prentice Hall; *Chapter 10: Cascade Control*.

* cited by examiner

CASCADED CONTROL OF A PICK-UP HEAD FOR MULTI-LAYER OPTICAL DATA STORAGE

BACKGROUND

The present techniques relate generally to optical data storage techniques. More specifically, the techniques relate to methods and systems for controlling a pick-up head for storage on optical disks.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080 p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

Although holographic storage systems may provide much higher storage capacities than prior optical systems, as is the case for all optical storage media, they may be vulnerable to poor tracking control due to the multiple layers of data. Accordingly, techniques that improve tracking control of the disc in an optical drive may be advantageous.

BRIEF DESCRIPTION

An aspect of the invention relates to a method of controlling position of a pick-up head of an optical drive, including manipulating the position of the pick-up head as a primary variable in a cascade control scheme, and manipulating current flowing through the pick-up head as a secondary variable in the cascade control scheme.

An aspect of the invention relates to a method of manufacturing an optical drive, including providing a position controller of a pick-up head in the optical drive, wherein the position controller is a primary controller in a cascade control structure of the pick-up head. Also provided is a current flow controller of the pick-up head, wherein the current controller is a secondary controller in the cascade control structure.

An aspect of the invention relates to an optical drive having: an optical pick-up head configured to record/read data tracks of a optical data storage disc; a position controller of the pick-up head, wherein the position controller is a primary controller in a cascade control scheme of the pick-up head; and a current controller of the pick-up head, wherein the current controller is a secondary controller in the cascade control scheme.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
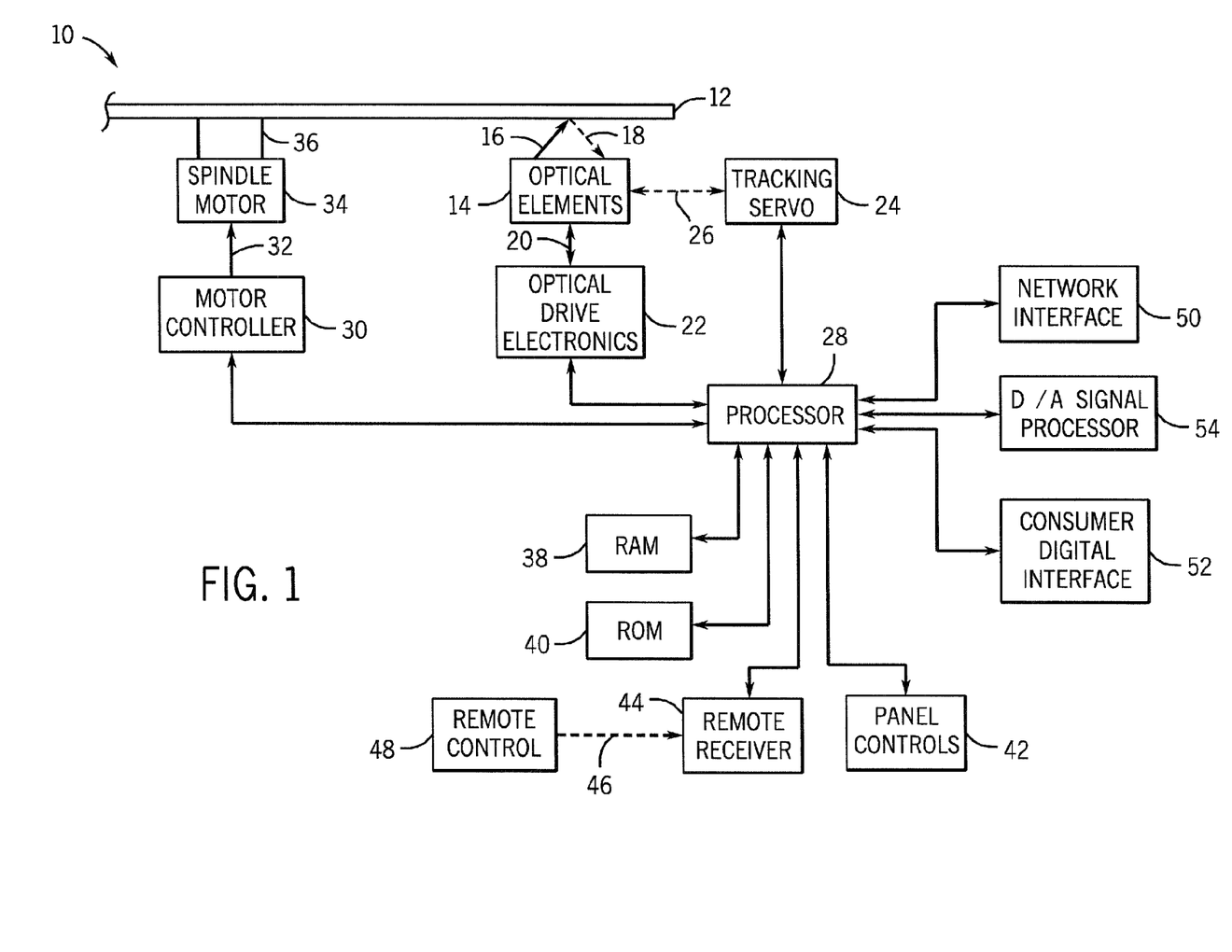
FIG. 1 is a schematic diagram of an optical disc drive in accordance with embodiments of the present technique.

FIG. 1 is an optical drive system 10 that may be used to record/read data from optical storage discs 12. The data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking/focusing servo 24 which has a mechanical actuator 26 configured to move the optical elements back and forth over the surface of the optical data disc 12. The optical drive electronics 22 and the servo 24 are controlled by a processor 28. In some embodiments in accordance with the present techniques, the processor 28 may be capable of determining the position of the optical elements 14, based on sampling information which may be received by the optical elements 14 and fed back to the processor 28. In some embodiments, the servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical drive system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
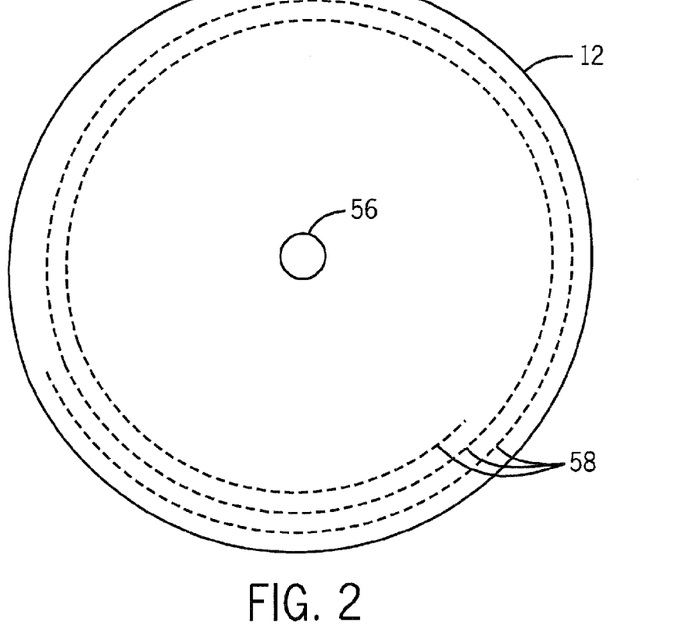
FIG. 2 is a top view of an optical disc that may be used in embodiments of the present technique.

The optical drive 10 may be used to read an optical data disc 12 containing data as shown in FIG. 2. Generally, the optical data disc 12 is a flat, round disc with one or more data storage layers embedded in. The data layers may include any number of surfaces that may reflect light, such as the micro-holograms used for bit-wise holographic data storage or a reflective surface with pits and lands. A spindle hole 56 couples to the spindle (e.g., the spindle 36 of FIG. 1) to control the rotation speed of the disc 12. On each layer, the data may be generally written in a sequential spiraling track 58 from the outer edge of the disc 12 to an inner limit, although circular tracks, or other configurations, may be used.

Injection moldable thermo-plastic based disc materials may be utilized in discs for micro-holographic data storage. Similar to conventional CD/DVD, the disc may spin relatively fast in the optical media player at hundreds or thousands of revolutions per minute (rpm) in a real-time recording and readout system. Vibration and wobble of the disc may be typically up to 100 µm, which is larger than a typical micro-hologram size (e.g., <10 µm). Therefore, tracks on the disc may be employed to enable real-time tracking and focusing. For a discussion various aspects of holographic data storage, see U.S. Patent Application Publication No. 2006/0227398A1, incorporated herein by reference in its entirety.

Figure 3:
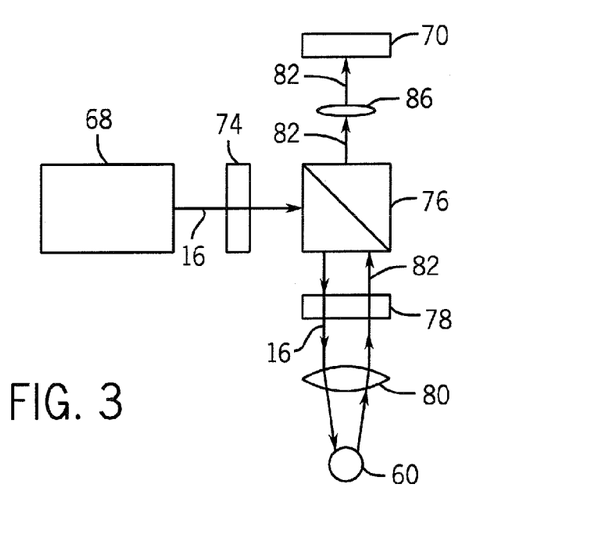
FIG. 3 is a perspective view of a optical head or pick-up head that may be used in embodiments of the present technique.

FIG. 3 depicts an exemplary detection head (showing impingement of the data beam). An emitter 68 may emit a reading beam 16, and various reflections of the reading beam 16 may be received at a detector 70. The reading beam 16 may first pass through a half wave plate 74, which changes the polarization of the reading beam 16. The reading beam 16 may then enter a polarizing beam splitter 76 which may reflect substantially the entire reading beam 16 by 90° so that it is directed towards a quarter wave plate 78, which changes the polarization of the reading beam 16. The beam 16 may then enter a focusing optic 80, which may focus the beam 16 onto a data point position on an optical disc 12. The data point position may contain a micro-hologram 60. The reflected beam 82 may pass through the focusing optic 80 and back through the quarter wave plate 78 so that the polarization of the reflected beam 82 are shifted and now substantially pass through the polarizing beam splitter 76 towards the detector 70. The beams 82 may pass through a focusing optic 86 and other optics prior to receipt at the detector 70.

A primary manipulated variable for an optical data storage system may be the position of the pick-up head. The optical pick-up head is an electromagnetic actuator consisting of coil, permanent magnet and wire spring damping system. The current flowing through the coil determines the movement of the head, in terms of speed and force. Hence, the current is regarded as the secondary variable influencing the primary control variable. A cascaded control structure is capable to improve the overall performance by manipulating a measurable secondary variable.

A cascaded control structure is capable of improving the system performance over single-loop control for specific applications. Cascaded control can be beneficial to accommodate: (i) disturbances to the control loop affecting an intermediate variable that directly affects the controlled outer loop variable; and/or (ii) the gain of the inner loop physical process for nonlinear behavior. In the first case, a cascade control structure can limit the effect of the disturbances. Inner disturbances can be removed early and will not propagate through the entire control loop. In the second case, of non-linear, gain variations or non-ideal properties of the inner loop, the cascaded control system can limit this by designing the inner loop accordingly.

Figure 5:
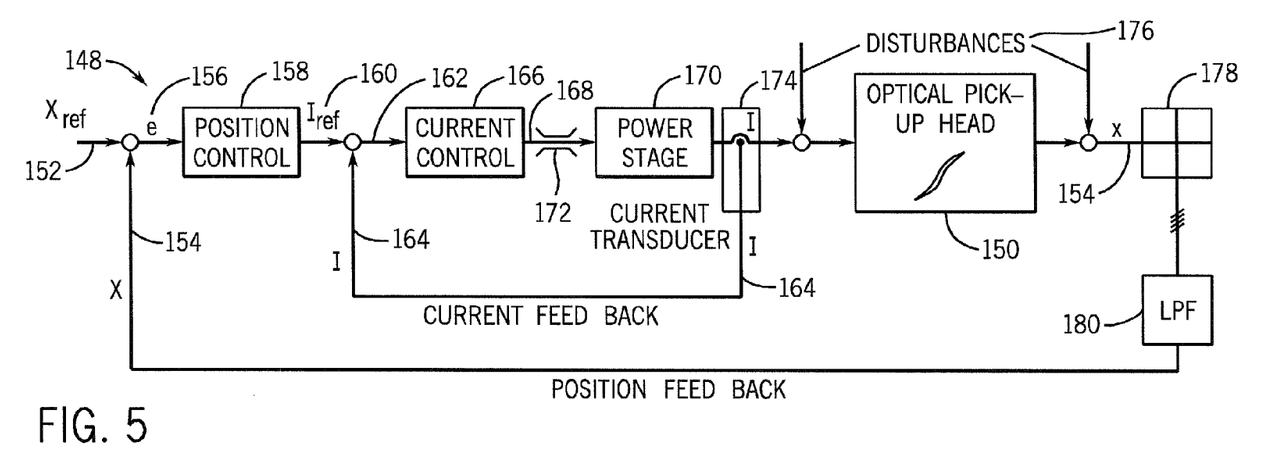
FIG. 5 is a flow diagram of a cascaded control scheme of a pick-up head of an optical disc drive in accordance with embodiments of the present technique.
Figure 6:
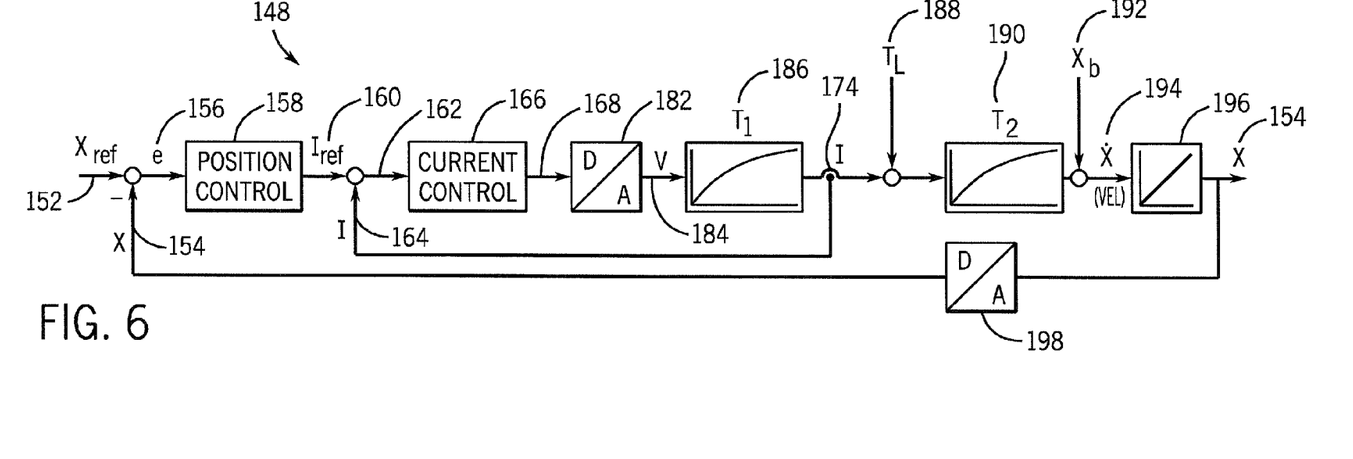
FIG. 6 is a flow diagram of the cascaded control scheme of FIG. 5 depicting alternate control symbols.

Focus and tracking control in optical data storage is in general realized by applying a single loop control. Considering the entire plant of an optical pick-up head, consisting of linear power stage, damped electro-magnetic actuator and optical pick-up head itself, disturbances are likely to be introduced at different points of the control loop. A control structure as shown in FIGS. 5 and 6 can further be used to effectively cancel disturbances in a feed-forward manner. This may give the flexibility to add adaptive estimation techniques on top of a cascaded control structure. The technique may improve access time/settling time to a step change in command. This structure facilitates rejection of disturbances at the point where they occur. The optimization of settling or access time is important for all types of optical recording techniques with multiple data layers. Disturbances at the inner loop can be rejected through the inner loop controller. The effect of this disturbance will generally not propagate through the outer control loop, which improves the control behavior in terms of settling time, for example.

Figure 4:
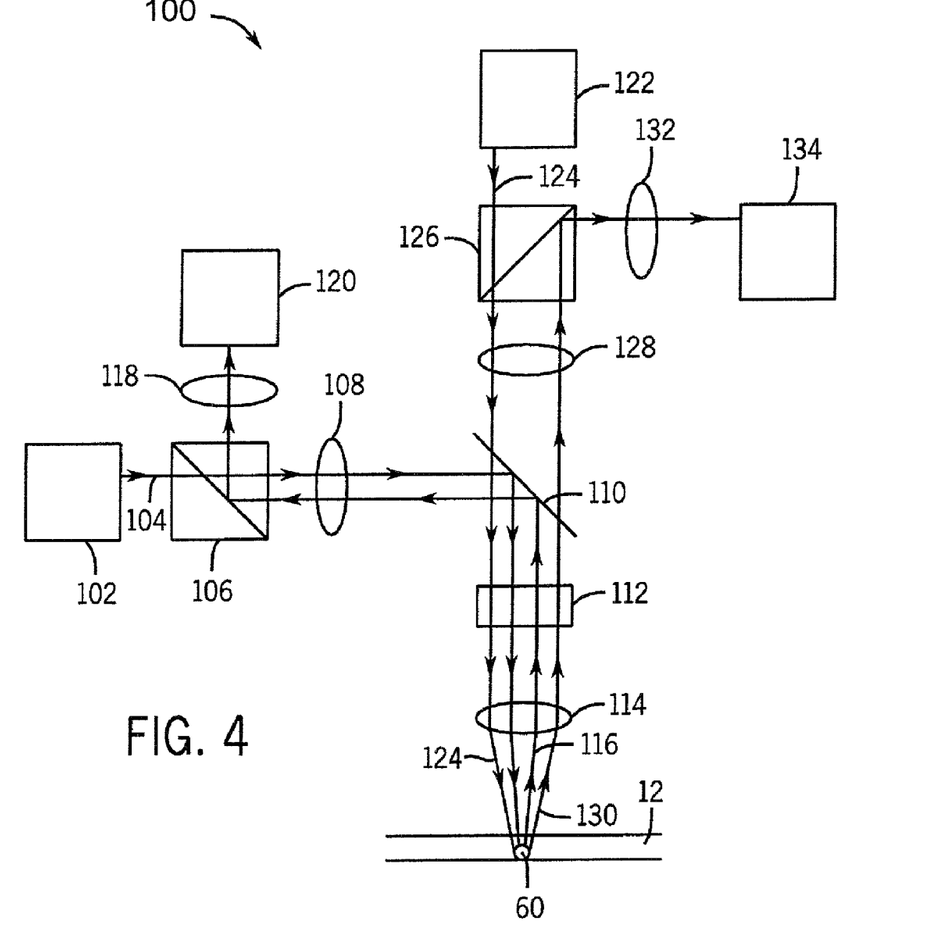
FIGS. 4 and 4A depict an exemplary dual-beam pick-up head that may be used in embodiments of the present technique.
Figure 4A:
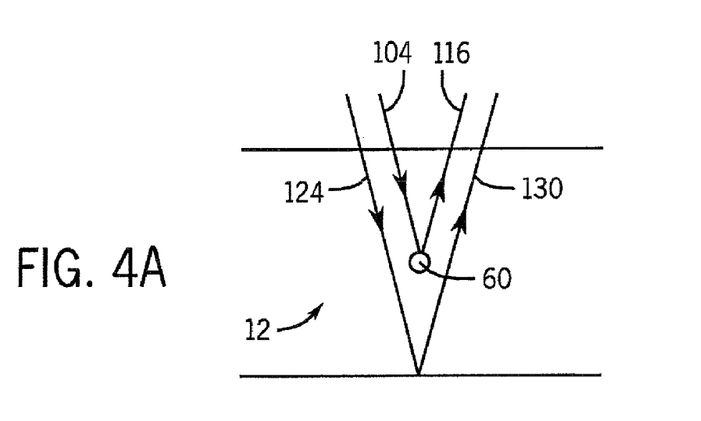

FIGS. 4 and 4A depict an exemplary dual-beam detection head system 100. A light source 102 emits a read beam 104 which passes through a polarizing beam splitter 106 and depth selecting optics 108. The read beam 104 is reflected off a dichroic mirror 110 and directed through the quarter wave plate 112 and the lens 114 to a micro-hologram 60 in the disc 12. The reflected data beam 116 from the micro-hologram 60 is passed back through the lens 116, quarter wave plate 114, dichroic mirror 110, and depth selecting optics 108. The reflected beam 116 is then passed through the polarizing beam splitter 106 and collecting optics 118 to a detector 120 where the data of the micro-hologram 60 is read.

Further, a light source 122 emits a tracking beam 124 which passes through a beam splitter 126 and depth selecting optics 128. The tracking beam 124 passes through the dichroic mirror 110, quarter wave plate 112, and the lens 114 to the disc 12. In the illustrated embodiment, the tracking beam 124 reflects off the disc 12 (e.g., near or at the bottom the disc) which may have a reflective layer, tracks, grooves, and the like. The reflected tracking beam 130 passes through the lens 114, quarter wave late 112, dichroic mirror 110, collecting optics 128, beam splitter 126, and collecting optics 132 to a detector 134.

FIG. 5 depicts a cascaded control scheme 148 of a pick-up head 150 of an optical disc player. The controlled or desired position 152, Xref, of the position (e.g., in micrometers or μm) of the pick-up head 150 is compared against the measured position 154(X) of the pick-up head 150. The position error 156(e) is fed to a position controller 158. An output of the position controller 158 is the controlled or desired current 160 (Iref, e.g., in amperes) through the pick-up head. A comparison 162 of this desired current 160 with the actual measured current 164(I) through the pick-up head is fed to the current controller 166. Subsequently, an output 168 of the current controller 166 may be fed to electromagnetic components of the pick-up head 150.

For example, an output 168 of the current controller 166 may be fed to a power stage component 170 (e.g., a transistor, amplifier, etc.) which converts the output 168, generating a physical current in coils of the pick-up head 150 based on the output 168. The component 170 may act as a physical amplifier, converting low voltage to higher voltage, for example. A scale limitation device 172 may provide threshold limits of lower and upper limits of the current flow through the coils. Moreover, the current through the coils or pick-up head 150 may be measured by a sensing element or current transducer 174, and, again, the measured current 164(I) may be provided as feedback to the current controller 166.

Disturbances realized that may affect the position of the pick-up head 150 are represented by the reference numeral 176. The control scheme 148 may compensate for such disturbances 176. In the illustrated embodiment, disturbances 176 depicted symbolically to the left of the head 150 may indicate disturbances associated with the electromagnetic components (e.g., coils, actuators, etc.), such as deviations in temperature, current, voltage, and so on. Disturbances 176 depicted symbolically to the right of the head 150 may indicate disturbances associated with deviation in the position of the disc (e.g., see disc 12 in FIGS. 2, 3, and 4 No disc is shown in FIG. 3) or with the reading of the disc, such that might be realized due to: the presence of dust or scratches on the disc; shock, vibration, or wobbling of the spinning disc; air flow around the disc, and so forth.

The position 154(X) of the pick-up head 150 is measured or detected at a detector 178 of the optical drive. For example, displacement of a laser beam emitted from the pick-up head 150 may be detected at detector 178 to determine the position 154(X) of the pick-up head. Such displacement may be measured, for instance, based on a reflection from the disc 12 of a data beam or tracking beam emitted by pick-up head 150. Voltages of the detector 178 may be subjected to a low pass filter 180 to provide the position 154(X) feedback signal to the position controller 158. The feedback may be voltage that correlates with the position 154(X).

FIG. 6 depicts the cascaded control scheme 148 of FIG. 5 with alternate control symbols. In implementation of the control scheme, 148, the output 168 of the current controller 166 is converted from digital to analog, as indicated by block 182, to provide the analog reference fed to the power stage component 170 (see FIG. 5). The current and voltage 184 experiences a time constant 186(T1). A torque disturbance 188 (TL) may be experienced on the current side, and the system may be further constrained by a second time constant 190 (T2). A load disturbance 192(Xb) may be manifested, and the resulting velocity 194 of movement of the head 150 may be integrated by a simple integrator 196 to provide the position 154. An analog signal correlative to the position 154(X) may be converted (block 198) to a digital signal and provided as feedback to the position controller 158.

Figure 7:
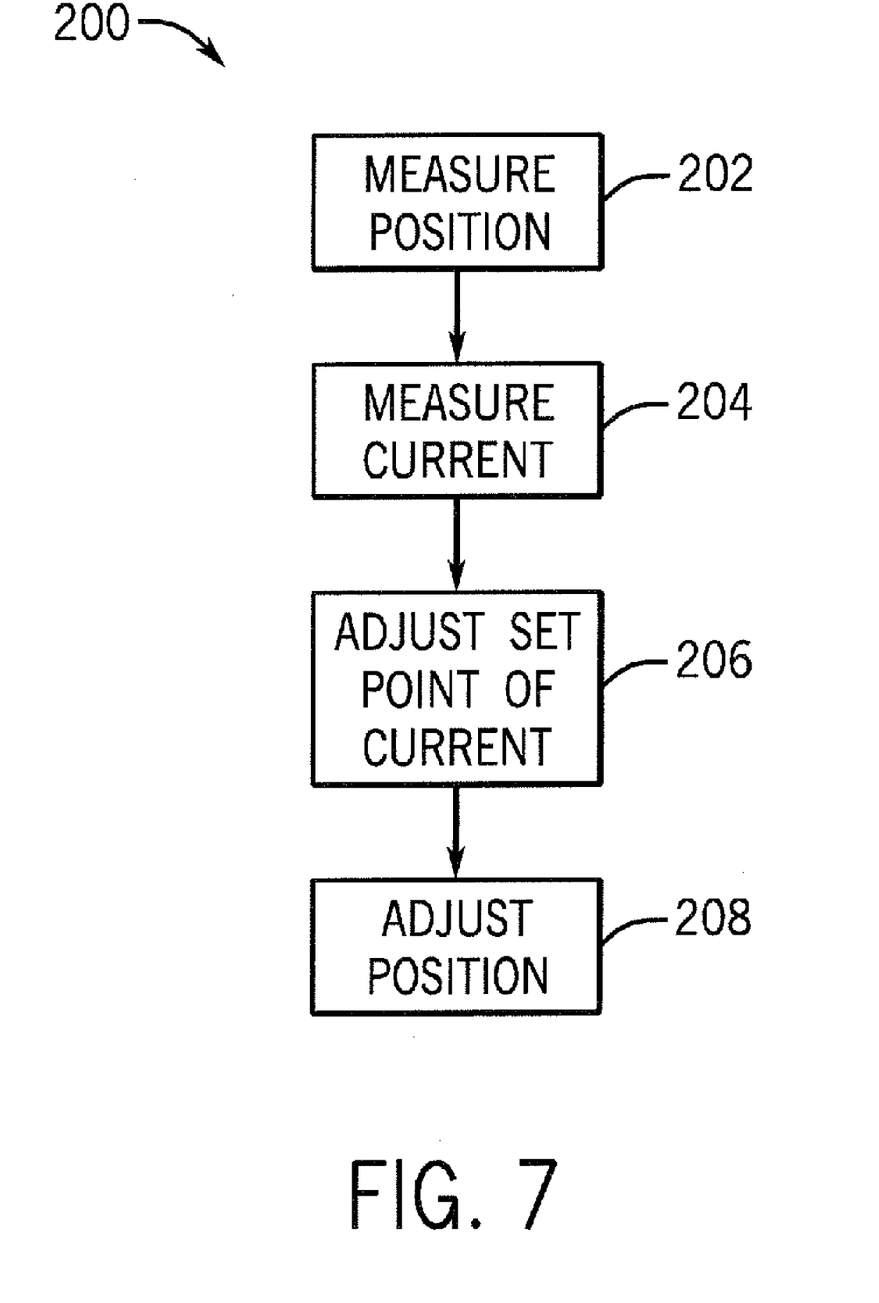
FIG. 7 is a block diagram of a method for controlling a pick-up head of an optical drive in accordance with embodiments of the present technique

FIG. 7 depicts a method 100 for controlling movement of a pick-up head of an optical drive. As the primary variable in a cascade control scheme of movement of the pick-up head, the position of the pick-up head is measured (block 202). Further, the current flowing through the pick-up (e.g., through a coil associated with the pick-up head) is also measured (block 204). A signal correlative to the difference between the measured position and desired position may be fed to a controller of the current flow to alter the set point of the current flow controller (block 206). The position of the pick-up head may then be adjusted to the desired position via the adjustment of the set point for the flow controller and the subsequent resulting change in the amount of current flow (block 208).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling position of a pick-up head of an optical drive, comprising:
   manipulating the position of the pick-up head as a primary variable in a cascade control scheme; and
   manipulating current flowing through the pick-up head as a secondary variable in the cascade control scheme.

2. The method of claim 1, comprising measuring the current flowing the pick-up head.

3. The method of claim 2, wherein a signal correlative to the amount of current flowing through the pick-up head is an input to a controller of the amount of current flowing through the pick-up head.

4. The method of claim 1, wherein an output of a controller of the position feeds a set point of a controller of the current flow.

5. The method of claim 1, wherein the cascade control scheme facilitates focus control in the optical drive.

6. The method of claim 1, wherein the cascade control scheme facilitates tracking control in the optical drive.

7. The method of claim 1, wherein the cascade control scheme cancels disturbances in a feed-forward manner.

8. The method of claim 1, comprising implementing adaptive estimation techniques in addition to the cascaded control scheme.

9. The method of claim 1, wherein the cascaded control scheme as compared to a single loop control of the position decreases settling time to a step change in command.

10. A method of manufacturing an optical drive, comprising:
    providing a position controller of a pick-up head in the optical drive, wherein the position controller is a primary controller in a cascade control structure of the pick-up head; and
    providing a current flow controller of the pick-up head, wherein the current controller is a secondary controller in the cascade control structure.

11. The method of claim 10, comprising providing a sensing element configured to measure current flow through the pick-up head.

12. The method of claim 11, wherein the current flow controller is configured to receive a signal correlative with the measured current flow.

13. The method of claim 10, wherein the position controller is configured to provide a set point of the current flow controller.

14. The method of claim 10, wherein the current flow controller comprises an inner loop in the cascade control structure.

15. An optical drive comprising:
    an optical pick-up head configured to record/read data tracks of a optical data storage disc;
    a position controller of the pick-up head, wherein the position controller is a primary controller in a cascade control scheme of the pick-up head; and
    a current controller of the pick-up head, wherein the current controller is a secondary controller in the cascade control scheme.

16. The drive of claim 15, wherein the optical pick-up head comprises an electro-magnetic actuator comprising a coil, permanent magnet, and wire damping system.

17. The drive of claim 16, wherein current flowing through the coil determines movement of the optical pick-up head.

18. The drive of claim 16, wherein current flowing through the coil determines movement in speed and force of the optical pick-up head.

19. The drive of claim 15, wherein the optical pick-up head comprises an electro-magnetic actuator comprising a linear power stage and a damped electro-magnetic actuator.

20. The drive of claim 15, comprising a sensing element configured to measure current flow through a coil of the pick-up head.

21. The drive of claim 15, comprising a transducer configured to measure current flow through the pick-up head as a secondary control variable of the pick-up head.

* * * * *